United States Patent
Ohshima et al.

(10) Patent No.: US 7,871,201 B2
(45) Date of Patent: Jan. 18, 2011

(54) TAPERED ROLLER BEARING, TAPERED ROLLER BEARING APPARATUS, AND AUTOMOTIVE PINION SHAFT SUPPORTING APPARATUS UTILIZING SAME TAPERED ROLLER BEARING APPARATUS

(75) Inventors: Hiroyuki Ohshima, Kashihara (JP); Kazutoshi Toda, Tondabayashi (JP); Hiroki Matsuyama, Nara (JP); Kouji Kawaguchi, Izumi (JP); Naoki Masuda, Nara (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 1190 days.

(21) Appl. No.: 11/504,759

(22) Filed: Aug. 16, 2006

(65) Prior Publication Data
US 2007/0041676 A1  Feb. 22, 2007

(30) Foreign Application Priority Data
Aug. 18, 2005 (JP) .............................. P2005-237552

(51) Int. Cl.
F16C 19/36 (2006.01)
F16H 57/04 (2010.01)
(52) U.S. Cl. ..................... 384/564; 384/571; 74/424
(58) Field of Classification Search ................. 384/564, 384/568, 571; 74/424
See application file for complete search history.

(56) References Cited
U.S. PATENT DOCUMENTS
5,007,747 A   4/1991  Takeuchi et al.

6,086,261 A   7/2000  Nakagawa et al.
6,390,685 B1  5/2002  Shimomura et al.
2002/0044707 A1  4/2002  Hanai et al.

FOREIGN PATENT DOCUMENTS

| EP | 0 756 095 A2 | 1/1997 |
|---|---|---|
| EP | 1 158 192 A2 | 11/2001 |
| JP | 3-113 | 1/1991 |
| JP | 3-12015 | 2/1991 |
| JP | 4-95318 | 8/1992 |
| JP | 8-177851 A | 7/1996 |
| JP | 10-196660 | 7/1998 |
| JP | 2000-193069 | 7/2000 |

(Continued)

OTHER PUBLICATIONS

Notice of Reason for Refusal dated Dec. 8, 2009, with English translation.

*Primary Examiner*—William C Joyce
(74) *Attorney, Agent, or Firm*—McGinn IP Law Group, PLLC

(57) ABSTRACT

In a tapered roller bearing, LWR/DW is in the range of 1.1 to 1.7 where LWR represents a roller effective length of tapered rollers and DW represents a roller mean diameter of tapered rollers. RCO/LRO is 30 to 150, and RCI/LRI is 50 to 260 where RCO represents a crowning radius of an outer ring, LRO represents a raceway length of the outer ring, RCI represents a crowning radius of an inner ring and LRI represents a raceway length of the inner ring. The following expressions are satisfied: $20° \leq \alpha \leq 30°$, and $\alpha - 0.87\gamma - 0.334 \leq BK \leq \alpha - 0.87\gamma - 0.167$, where $\alpha$ represents a raceway angle of the outer ring, $\gamma$ represents a roller angle of the tapered rollers, and BK represents a rib angle of a large rib portion of the inner ring.

14 Claims, 16 Drawing Sheets

FOREIGN PATENT DOCUMENTS

| | | |
|---|---|---|
| JP | 2000-289403 | 10/2000 |
| JP | 2001-65574 | 3/2001 |
| JP | 2002-181053 | 6/2002 |
| JP | 2002-221223 | 8/2002 |
| JP | 2003-130059 | 5/2003 |
| JP | 2003-343552 | 12/2003 |
| JP | 2005-172113 | 6/2005 |
| WO | 2005/080813 A1 | 2/2005 |
| WO | WO 2005/080813 A1 | 2/2005 |
| WO | WO 2005/100809 | 10/2005 |

TAPERED ROLLER BEARING, TAPERED ROLLER BEARING APPARATUS, AND AUTOMOTIVE PINION SHAFT SUPPORTING APPARATUS UTILIZING SAME TAPERED ROLLER BEARING APPARATUS

BACKGROUND OF THE INVENTION

The present invention relates to a tapered roller bearing which is used in differentials for motor vehicles and industrial machines, a tapered roller bearing apparatus which utilizes the tapered roller bearing and an automotive pinion shaft supporting apparatus which utilizes the tapered roller bearing apparatus.

Since tapered roller bearings are characterized in that they have a high load capacity and a high rigidity, compared to ball bearings, the tapered roller bearings are used in automotive pinion shaft supporting apparatuses in differentials and transaxles of motor vehicles. However, since the tapered roller bearings also have a drawback of a large running torque (loss), techniques in which raceways of inner and outer rings and rolling contact surfaces of tapered rollers are crowned to reduce the rolling friction (refer to, for example, Patent Document Nos. 1 to 2) have been proposed.

In the tapered roller bearings described Patent Document Nos. 1 to 2, the performance gain of the tapered roller bearings was attempted to be realized by controlling the shapes of crownings applied to the raceway surfaces and the rolling contact surfaces. However, no attempt had been made to control the amounts of crownings so as to reduce the running torque of a tapered roller bearing by paying attention to an idea in which crowning is taken as quantity. On the other hand, while one of main causes of the generation of running torque in a tapered roller bearing in a differential is the rolling viscous resistance of tapered rollers and the agitation loss of oil, there had been provided no clear guideline on how to reduce them.

To cope with this, the present applicant proposed a tapered roller bearing which could reduce the running torque effectively in consideration of various factors (Patent document No. 3).

The tapered roller bearing so proposed includes an outer ring, an inner ring, a plurality of tapered rollers interposed between the outer and inner rings and a cage for the tapered rollers, wherein where z represents the number of tapered rollers, LWR represents a roller effective length, DW represents a roller mean diameter and dm represents a roller PCD, a roller filling rate which is expressed by $z \cdot DW/(\pi \cdot dm)$ is in the range of 0.7 to 0.92, and a ratio of a roller length to a roller diameter which is expressed by LWR/DW is in the range of 1.1 to 1.7, and wherein where RCO represents a crowning radius of the outer ring, LRO represents a raceway length of the outer ring, RCI represents a crowning radius of the inner ring and LRI represents a raceway length of the inner ring, an outer ring crowning parameter (=RCO/LRO) is 30 to 150, and an inner ring crowning parameter (=RCI/LRI) is 50 to 260. Thus, since the oil agitation loss and the rolling viscous resistance are reduced by reducing the roller length/roller diameter while maintaining the roller filling rate within the narrow range and the rolling viscous resistance is reduced by setting the crowning parameters in those ways, the running torque can be reduced effectively.

In addition, the proposed roller bearing includes an outer ring, an inner ring, a plurality of tapered rollers interposed between the outer and inner rings and a cage for the tapered rollers, wherein where z represents the number of tapered rollers, LWR represents a roller effective length, DW represents a roller mean diameter and dm represents a roller PCD, a roller filling rate which is expressed by $z \cdot DW/(\pi \cdot dm)$ is in the range of 0.7 to 0.92, and a ratio of a roller length to a roller diameter which is expressed by LWR/DW is in the range of 1.1 to 1.7, and wherein respective raceway surfaces of the outer ring and the inner ring and rolling contact surfaces of the tapered rollers are crowned such that:

a total crowning amount (depth) (=outer ring crowning amount+inner ring crowning amount+roller crowning amount×2) is 50 μm or larger;

an outer ring crowning rate (=outer ring crowning amount/total crowning amount) is 40% or larger; and a roller crowning rate (=(roller crowning amount×2)/total crowning amount) is 20% or smaller. Thus, the oil agitation loss and the rolling viscous resistance are reduced by reducing the roller length/roller diameter while maintaining the roller filling rate within the narrow range and the rolling viscous resistance is reduced by setting the crowning amounts in those ways.

Patent Document No. 1: JP-A-2003-130059
Patent Document No. 2: JP-A-2001-65574
Patent Document No. 3: WO2005100809 (PCT/JP2005/7260)

While the tapered roller bearing proposed by the present applicant can reduce the running torque largely by controlling the amounts of crownings and the shape of tapered rollers, compared to the conventional tapered roller bearings that had been proposed before then, when the contact angle is increased in order to reduce the oil agitation loss, the LWR/DW approaches from 1.7 to 1.1, and the diameter of the roller is increased. On the other hand, when the diameter of the roller increases, in order to increase the strength of the rib surface of the large rib portion against which large diameter side end faces of the rollers slide, the contact position (refer to e in FIGS. 1 to 2) between the rib surface and the larger diameter side end faces is raised, and as a result, there may occur a case where the running torque is increased in a low rotational speed range of 10 to 300 rpm.

SUMMARY OF THE INVENTION

An object of the present invention is to improve a tapered roller bearings that have been proposed before by the applicant and provide a tapered roller bearing which can reduce the running torque in the low rotational speed range even when the roller diameter is increased, a tapered roller bearing apparatus which utilized the tapered roller bearing and an automotive pinion shaft supporting apparatus which utilizes the tapered roller bearing apparatus.

With a view to attaining the object, according to the invention, there is provided a tapered roller bearing including an outer ring, an inner ring, a plurality of tapered rollers interposed between the outer and inner rings and a cage for the tapered rollers, wherein where LWR represents a roller effective length and D1 represents a roller mean diameter, a ratio of a roller length to a roller diameter which is expressed by LWR/DW is in the range of 1.1 to 1.7, wherein where RCO represents a crowning radius of the outer ring, a raceway length of the outer ring, RCI represents a crowning radius of the inner ring and LRI represents a raceway length of the inner ring, an outer ring crowning parameter (=RCO/LRO) is 30 to 150, and an inner ring crowning parameter (=RCI/LRI) is 50 to 260, and wherein where α represents an outer ring raceway angle, γ represents a roller angle, and BK represents a rib angle, $20° \leq α \leq 30°$, and $α-0.87γ-0.334 \leq BK \leq α-0.87γ-0.167$.

In addition, according to the invention, there is provided a tapered roller bearing including an outer ring, an inner ring, a plurality of tapered rollers interposed between the outer and inner rings and a cage for the tapered rollers, wherein where LWR represents a roller effective length and DW represents a roller mean diameter, a ratio of a roller length to a roller diameter which is expressed by LWR/DW is in the range of 1.1 to 1.7, wherein respective raceway surfaces of the outer ring and the inner ring and rolling contact surfaces of the tapered rollers are crowned such that:

a total crowning amount (=outer ring crowning amount+ inner ring crowning amount+roller crowning amount×2) is 50 μm or larger;

an outer ring crowning rate (=outer ring crowning amount/ total crowning amount) is 40% or larger; and a roller crowning rate (=(roller crowning amount×2)/total crowning amount) is 20% or smaller, and wherein when α represents an outer ring raceway angle, γ represents a roller angle, and BK represents a rib angle, $20° \leq α \leq 30°$, and $α-0.87γ-0.334 \leq BK \leq α-0.87γ-0.167$.

According to the tapered roller bearing, the contact position between the large diameter side end faces of the rollers and the rib surface of the large rib portion can be lowered by causing the rib surface of the large rib portion to rise by reducing the rib angle, and as a result, the running torque can be reduced in the low rotational speed range. An upper limit value (α-0.87γ-0.167) in the range of the rib angle is a value at which a running torque is obtained which is substantially the same as that of the conventional tapered roller bearings that have been proposed before by the applicant for the subject patent application. In other words, the upper limit value is a value which can suppress the increase in running torque in the low rotational speed range. On the other hand, while the torque reduction effect increases as the rib angle gets smaller, in the event that the rib angle gets too small, the large diameter side end faces of the rollers come to interfere with the recess portion of the large rib portion, and hence, the contact stress between the large diameter side end faces of the rollers and the rib surface becomes too large, the torque being thereby increased, on the contrary. A lower limit (α-0.87γ-0.334) in the range of the rib angle is set to a value which can avoid the interference with the recess portion.

In addition, in the tapered roller bearing, where d represents a bore diameter of the inner ring and D represents an outside diameter of the outer ring, a roller diameter parameter (2DW/(D-d)) may be made to fall in the range of 0.44 to 0.52.

In this case, since the roller diameter is larger than that of conventional bearings of the same size, the free space volume in the interior of the bearing is increased, and hence, the oil is allowed to flow easily through the interior of the bearing, the agitation loss being thereby reduced.

Additionally, a tapered roller bearing apparatus may be provided in which a lubricating oil inflow restricting unit for restricting the inflow of an oil is provided on an axial edge side of the tapered roller bearing described above. This lubricating oil inflow restricting unit may be such that an annular portion is formed on a small diameter side edge portion of the cage of the tapered roller bearing in such a manner as to extend radially inwards from a position which lies close to the outer ring, and an inner circumferential edge portion of the annular portion so formed is made to approach the inner ring so as to form a labyrinth seal between the inner ring and the annular portion. In addition, the tapered roller bearing apparatus may be made up by providing as the lubricating oil inflow restricting unit a separate member which does not make up the tapered roller bearing. For example, a labyrinth may be provided on a bearing housing.

In this case, the inflow of oil into the interior of the bearing is restricted, and hence, the rolling viscous resistance and agitation loss are reduced, whereby the running torque is, in turn, reduced.

In addition, in the tapered roller bearing, the outer ring raceway angle α may be made to fall within the range of 25° to 30°.

In this case, the pumping action is enhanced, and since the discharge of oil is promoted, the agitation loss of oil is reduced, whereby the running torque is, in turn, reduced.

Additionally, in the tapered roller bearing, an inner ring crowning rate (=inner ring crowning amount/total crowning amount) may be made to be 10% or larger.

In this case, contact loads acting in the vicinity of axial edge portions of the contact surface formed between the inner ring raceway surface and the rolling contact surfaces of the rollers can be reduced, whereby even in the event that a so-called edge load is applied, the operation thereof can be reduced, so as to prevent the reduction in the life of the relevant bearing.

In addition, according to the invention, there is provided an automotive pinion shaft supporting apparatus in which tapered roller bearings are disposed on a pinion gear side and an opposite side thereto of a pinion shaft, respectively, and the tapered roller bearing apparatus having the lubricating oil inflow restricting unit is provided on the pinion gear side.

In the automotive pinion shaft supporting apparatus like this, the inflow of oil into the tapered roller bearing lying on a head side where oil flows in easily is restricted by the lubricating oil inflow restricting unit (for example, a labyrinth seal), whereby the running torque can be reduced.

ADVANTAGE OF THE INVENTION

According to the tapered roller bearing, the tapered roller bearing apparatus and the automotive pinion shaft supporting apparatus which utilizes the tapered roller bearing apparatus, even in the event that the roller diameter is increased, the running torque can be reduced in the low rotational speed range.

DETAILED DESCRIPTION OF PREFERRED EMBODIMENTS

Hereinafter, a tapered roller bearing, a tapered roller bearing apparatus and an automotive pinion shaft supporting apparatus according to an embodiment of the invention will be described in detail by reference to the accompanying drawings.

Figure 1:
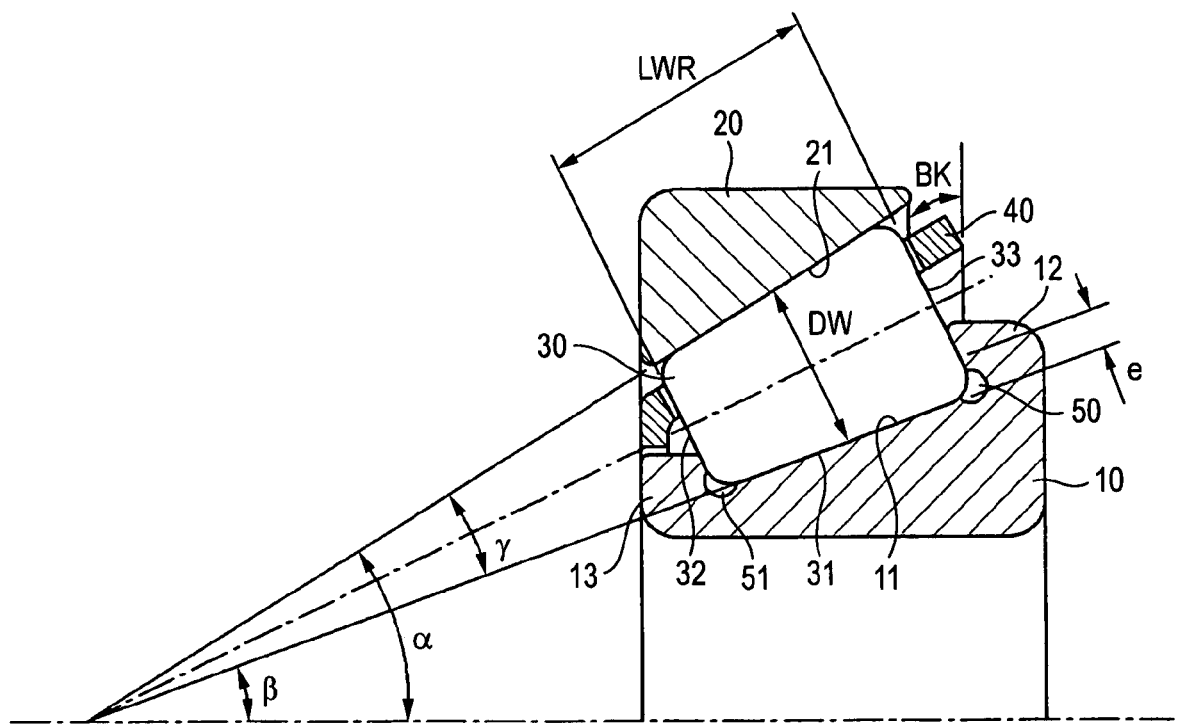
FIG. 1 is an axial sectional view of a tapered roller bearing according to an embodiment of the invention.

FIG. 1 is an axial sectional view of a tapered roller bearing according to an embodiment of the invention. This tapered roller bearing is used on a pinion gear side of an automotive differential as an automotive pinion shaft supporting apparatus and includes an inner ring 10 in which an inner ring raceway surface 11 made up of a coned surface is formed on an outer circumference thereof, an outer ring 20 in which an outer ring raceway surface 21 made up of a coned surface is formed on an inner circumference thereof, a plurality of tapered rollers 30 interposed between the inner and outer rings and each having a rolling contact surface 31 which is made up of a coned surface and is formed on an outer circumference thereof, and a case 40 for retaining these tapered rollers 30 circumferentially at predetermined intervals. A large rib portion 12 and a small diameter rib portion 13 which control the axial movement of the tapered rollers 30 are formed on a large diameter side (right in the figure) and a small diameter side (left in the figure) of the inner ring 10, respectively. Furthermore, recess portions 50, 51 which are made up of notches having arc-shaped cross sections are formed in side end portion of the large rib portion 12 and a small diameter rib portion 13 side end portion of the inner ring raceway surface 11, respectively. The inner ring, the outer ring and the tapered rollers are made of bearing steel, for example.

Figure 3:
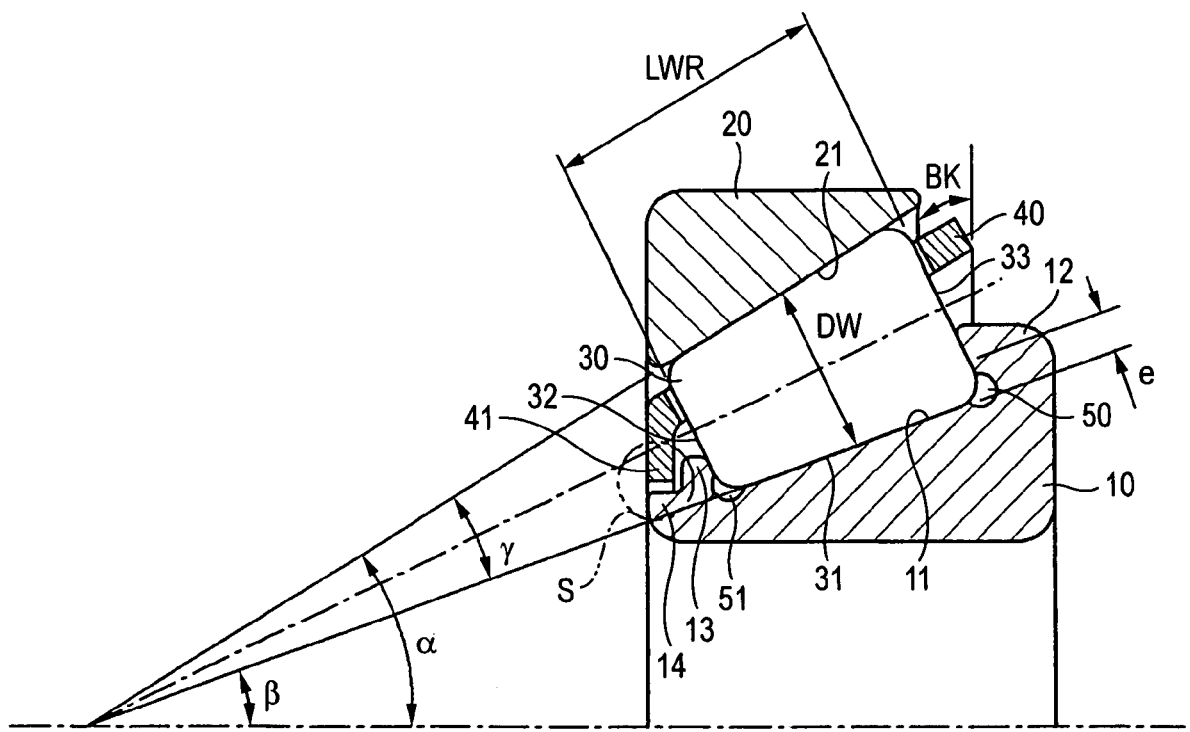
FIG. 3 is an axial sectional view of a tapered roller bearing according to another embodiment of the invention.

FIG. 3 is an axial sectional view of a tapered roller bearing according to another embodiment of the invention. In this embodiment, a cylindrical portion 14 which is smaller in outside diameter than the small diameter rib portion 13 is formed on a portion which extends from the small diameter rib portion 13 to reach a left edge side of the inner ring. On the other hand, an annular portion 41 is formed on a small diameter side (left in the figure) edge portion of the cage 40 in such a manner as to extend radially inwards from a position lying in the vicinity of the outer ring 20. An inner circumferential edge portion of the annular portion 41 approaches an inner circumferential surface of the cylindrical portion 14 of the inner ring 10 and a side surface of the small diameter rib portion 13, whereby a labyrinth seal S is formed. Since the labyrinth seal S, which is a lubricating oil inflow restricting unit, is formed between the case 40 and the inner ring 10 in this way, an inflow of oil from the left in the figure into the interior of the bearing can be restricted.

Figure 2:
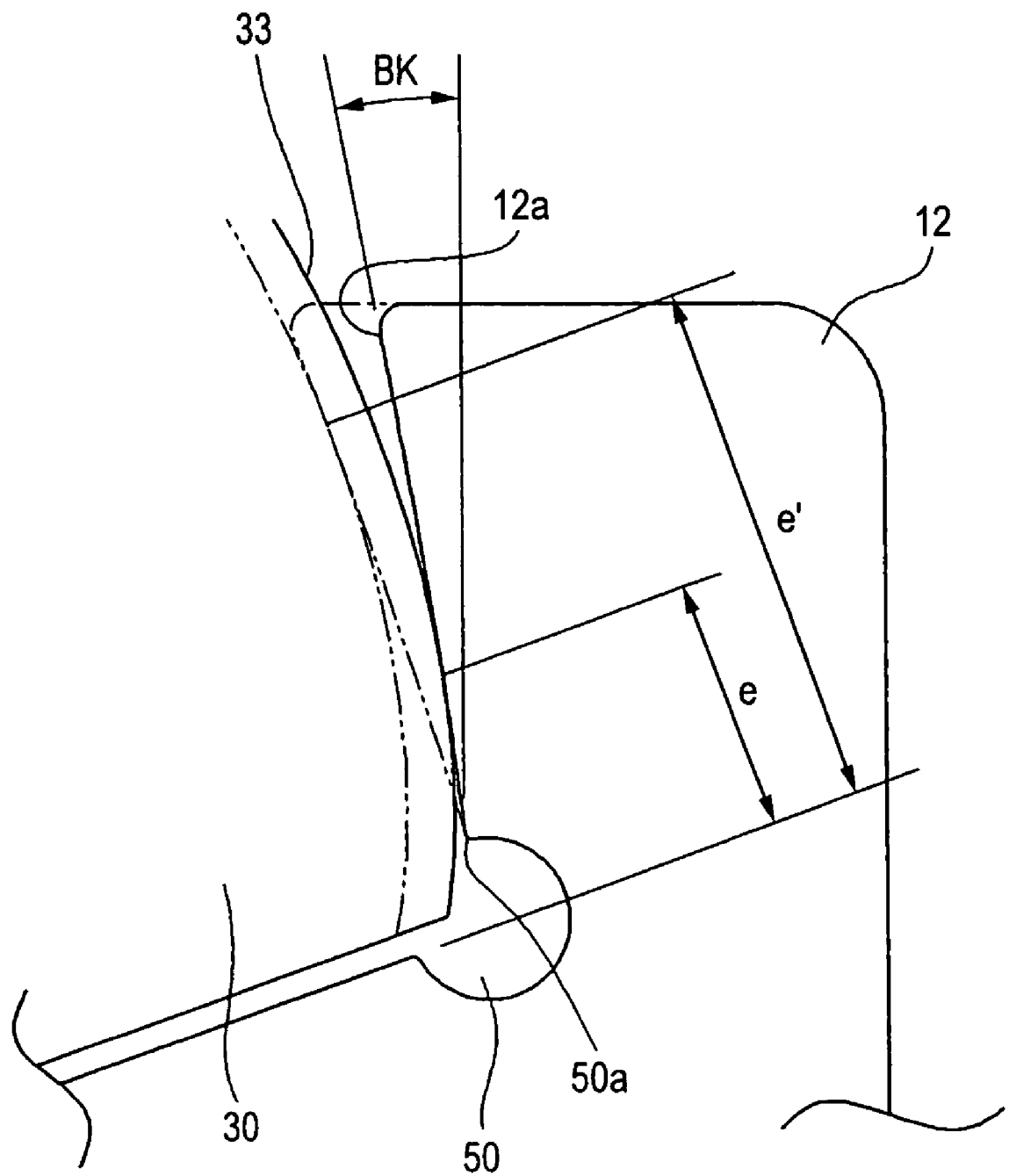
FIG. 2 is an explanatory enlarged diagram showing the vicinity of a rib surface of a large rib portion of the tapered roller bearing shown in FIG. 1.

The invention is characterized in that, where $\alpha$ represents an outer ring raceway angle (an outer ring contact angle), $\gamma$ represents a roller angle, and BK represents a rib angle as shown in FIG. 2, $20° \leq \alpha \leq 30°$, and $\alpha - 0.87\gamma - 0.334 \leq BK \leq \alpha - 0.87\gamma - 0.167$ and, the amounts of crownings applied are also controlled to fall within the specific ranges, and therefore, a general concept of crowning will next be described by taking the inner ring as an example.

Figure 4:
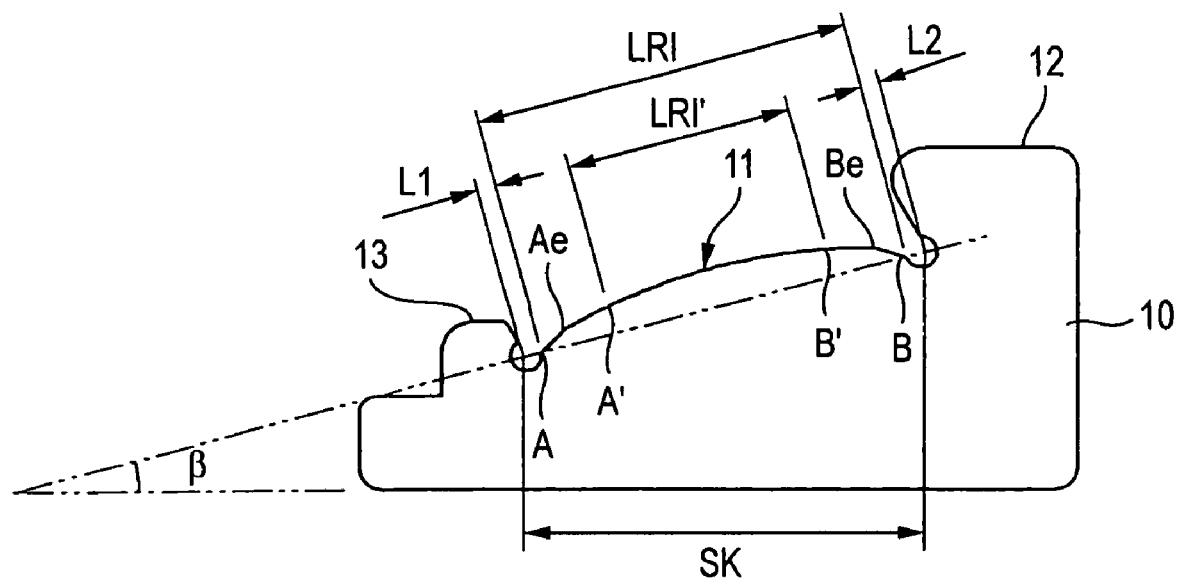
FIG. 4 is a diagram showing a contour and the shape of a crowning (in the case of a composite crowning) of the inner ring.

FIG. 4 is a diagram which shows a contour of an axial section of the inner ring 10 in which the inner ring raceway surface 11 is crowned in an exaggerated fashion. In the figure, a crowning which slightly protrudes radially outwards is applied to the inner ring raceway surface 11 which is brought into contact with the rolling contact surface 31 of the tapered roller 30. This crowning is a composite crowning which is formed into a trapezoidal shape in which an arc is made to constitute an upper side.

Hereinafter, a calculation method of an crowning amount that is applied to the inner ring 10 (hereinafter, also referred to as an inner ring crowning amount) will be described. In FIG. 4, when the width of the inner ring raceway surface 11 with respect to the axial direction of the inner ring 10 is SK, a tapered angle of the inner ring raceway surface 11 is $\beta$, and chamfered dimensions shown as formed along both edge portions of the inner ring raceway surface 11 are L1, L2, a raceway length. LRI is obtained by the following equation (1):

$$LRI = SK/\cos \beta - (L1+L2) \tag{1}$$

Here, a length LRI' is defined from a center point of the raceway length LRI as shown in the figure in such a manner that LRI'=0.6 LRI, and points on the inner ring raceway surface 11 which correspond to ends of the dimension LRI' are represented by A' and B', respectively. Note that while, in this case, A', B' reside inwards of end points Ae, Be of the arc, respectively, A', B' may coincide with the end points Ae, Be of the arc, respectively.

Figure 5:
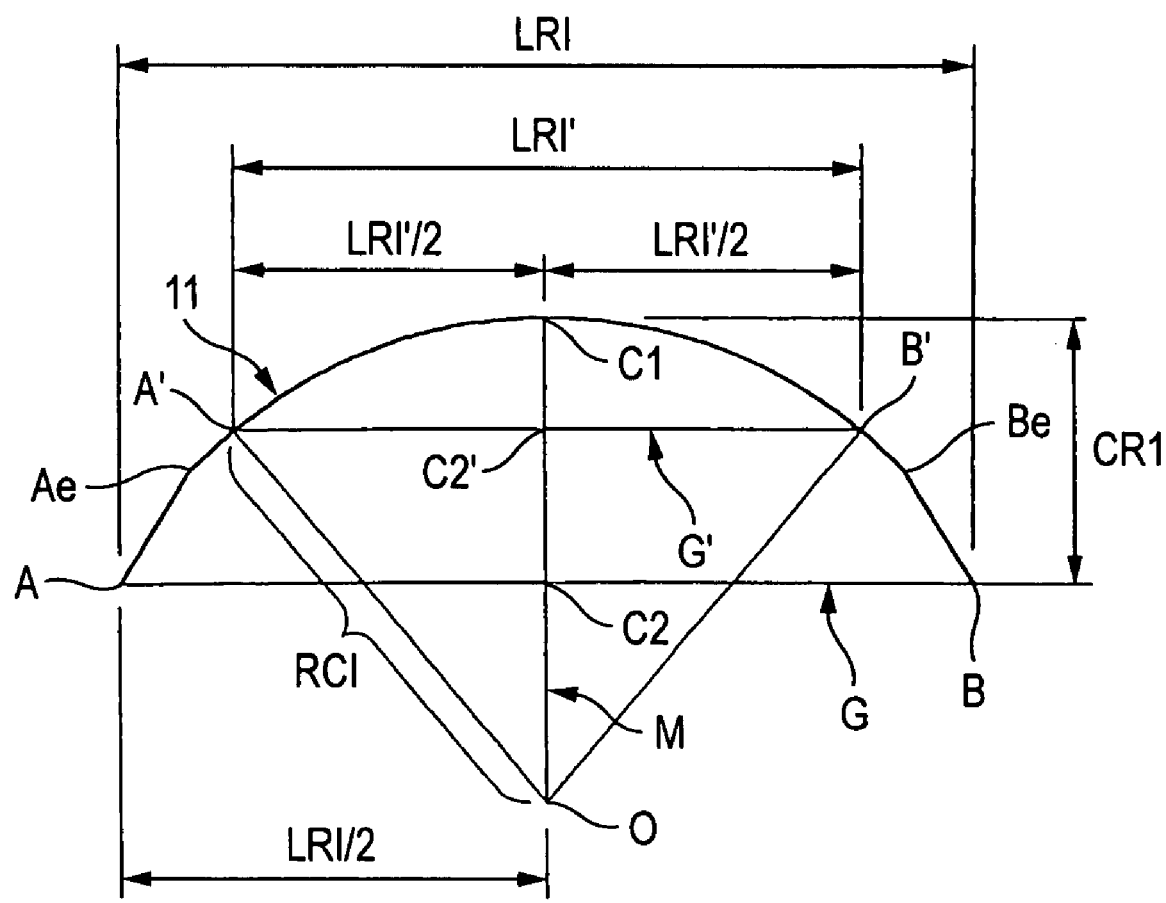
FIG. 5 is a diagram showing exemplarily the shape of the crowning (in the case of the composite crowning) applied to the raceway surface of the inner ring.

FIG. 5 is a diagram which shows exemplarily a section of the crowning between an end point A and an end point B of the raceway length LRI of the inner ring raceway surface 11 shown in FIG. 4. In FIG. 5, a straight line M which passes through a center point C2' of a chord G' of the crowning at the length LRI' and a center O of the arc of the crowning intersects the chord G' at right angles and passes through a central point C1 of the arc of the crowning at the length LRI'. A distance dimension from the central point C1 of the arc of the crowning to a middle point C2 of a chord G of the crowning at the raceway length LRI is represented by the crowning amount CRI of the inner ring 10.

Note that the shape of the inner ring crowning is not limited to the trapezoidal shape in which the arc constitutes the upper side as shown in FIG. 5, and hence, a crowning shape of every kind may be adopted which includes a shape made up of a single arc, a shape made up of a plurality of arcs, a logarithmic crowning, an oval crowning and the like, and the aforesaid concept of the crowning amount can be applied to all those crowning shapes.

The concept of crowning can be applied to the rollers and the outer ring, as well. Furthermore, the definition of the crowning amount can be applied to the rollers and the outer ring.

Note that a crowning made up of a combination of a plurality of shapes within the range of the rolling contact length (the rolling contact surface length) is referred to as a composite crowning, and a crowning made up of a single arc shape within the range of the raceway length is referred to as a full crowning.

Next, the concept of crowning and the concept of the crowning amount when an applied crowning is the full crowning will be described.

Figure 6:
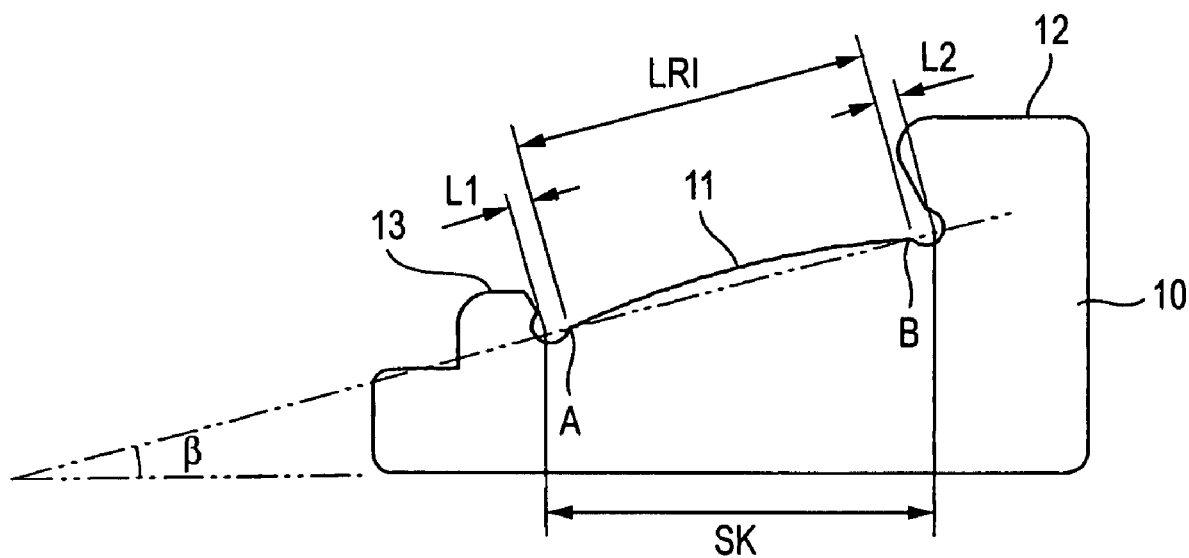
FIG. 6 is a diagram showing a contour and the shape of a crowning (in the case of a full crowning) of the inner ring.

FIG. 6 is a diagram showing a contour of an axial section of the inner ring 10 in which a full crowning is applied to the inner ring raceway surface 11 thereof in such a manner that the contour is distended. In the figure, a raceway length LRI is obtained by the same equation as that used to obtain the LRI of the raceway shown in FIG. 4:

$$LRI = SK/\cos\beta - (L1 + L2)$$

Figure 7:
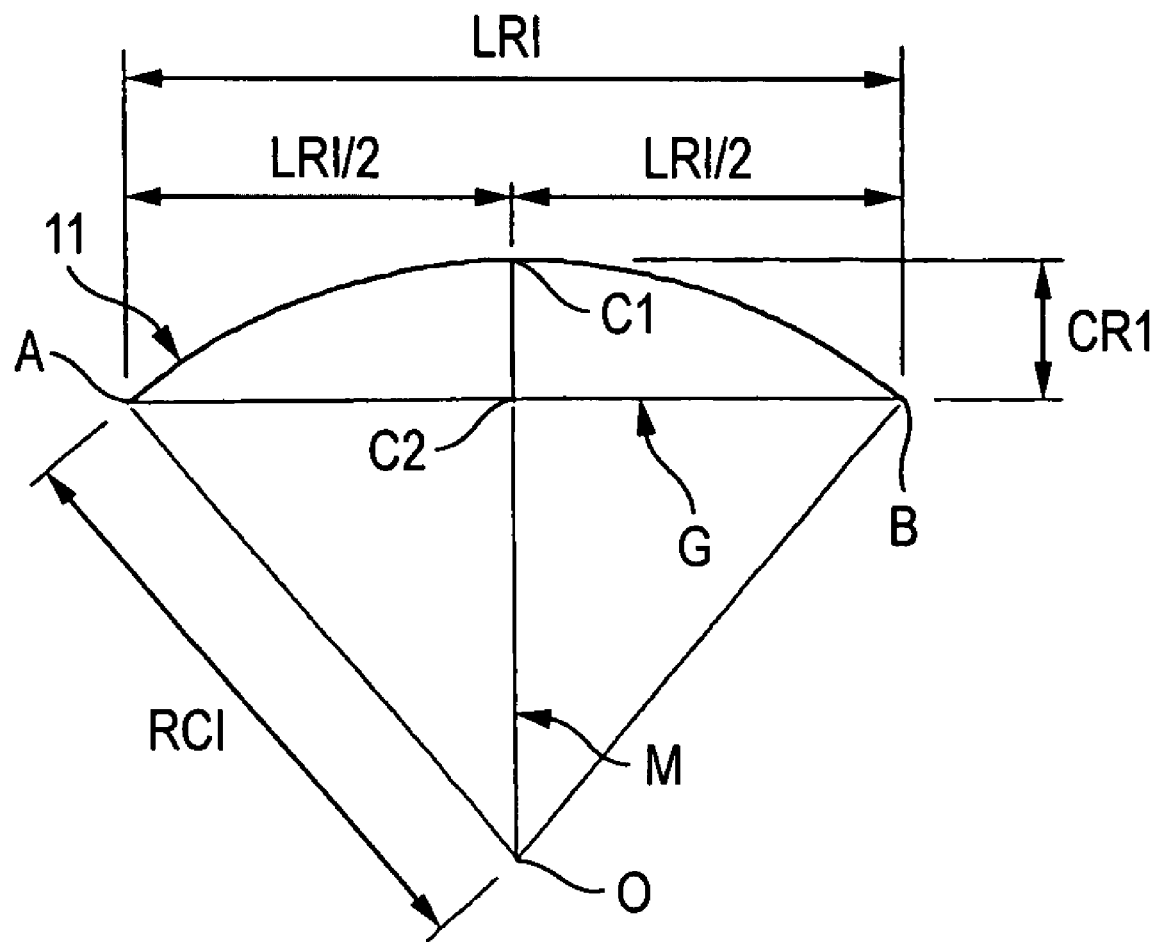
FIG. 7 is a diagram showing exemplarily the shape of the crowning (in the case of the full crowning) applied to the raceway surface of the inner ring.

On the other hand, FIG. 7 is a diagram which shows exemplarily a section of the crowning between an end point A and an end point B of the raceway length LRI of the inner ring raceway surface 11 shown in FIG. 6. In the figure, a straight line M which passes through a middle point C2 of a chord G of the crowning at the length LRI and a center O of an arc of the crowning intersects the chord G at right angles and passes through a central point C1 of the arc of the crowning at the length LRI. A distance dimension defined by the central point C1 of the arc of the crowning and the middle point C2 is represented by an inner ring crowning amount CRI. Namely, assuming that the radius of the crowning arc is RCI as shown in the figure, the inner ring crowning amount CRI is obtained by the following equation (2):

$$CRI = RCI - \{RCI^2 - (LRI/2)^2\}^{1/2} \qquad (2)$$

Figure 8:
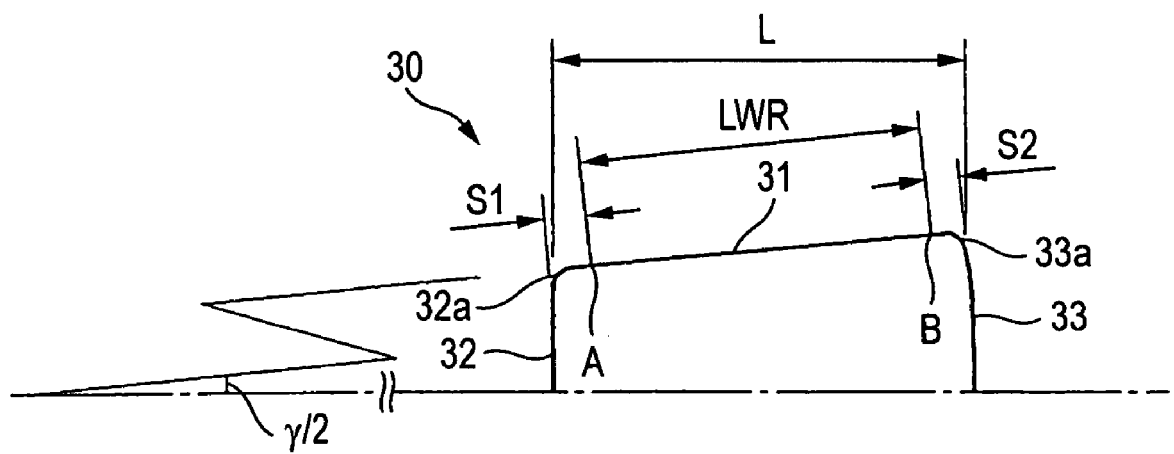
FIG. 8 is a diagram showing a contour of an upper half of a section of a tapered roller and the shape of the crowning thereon.
Figure 9:
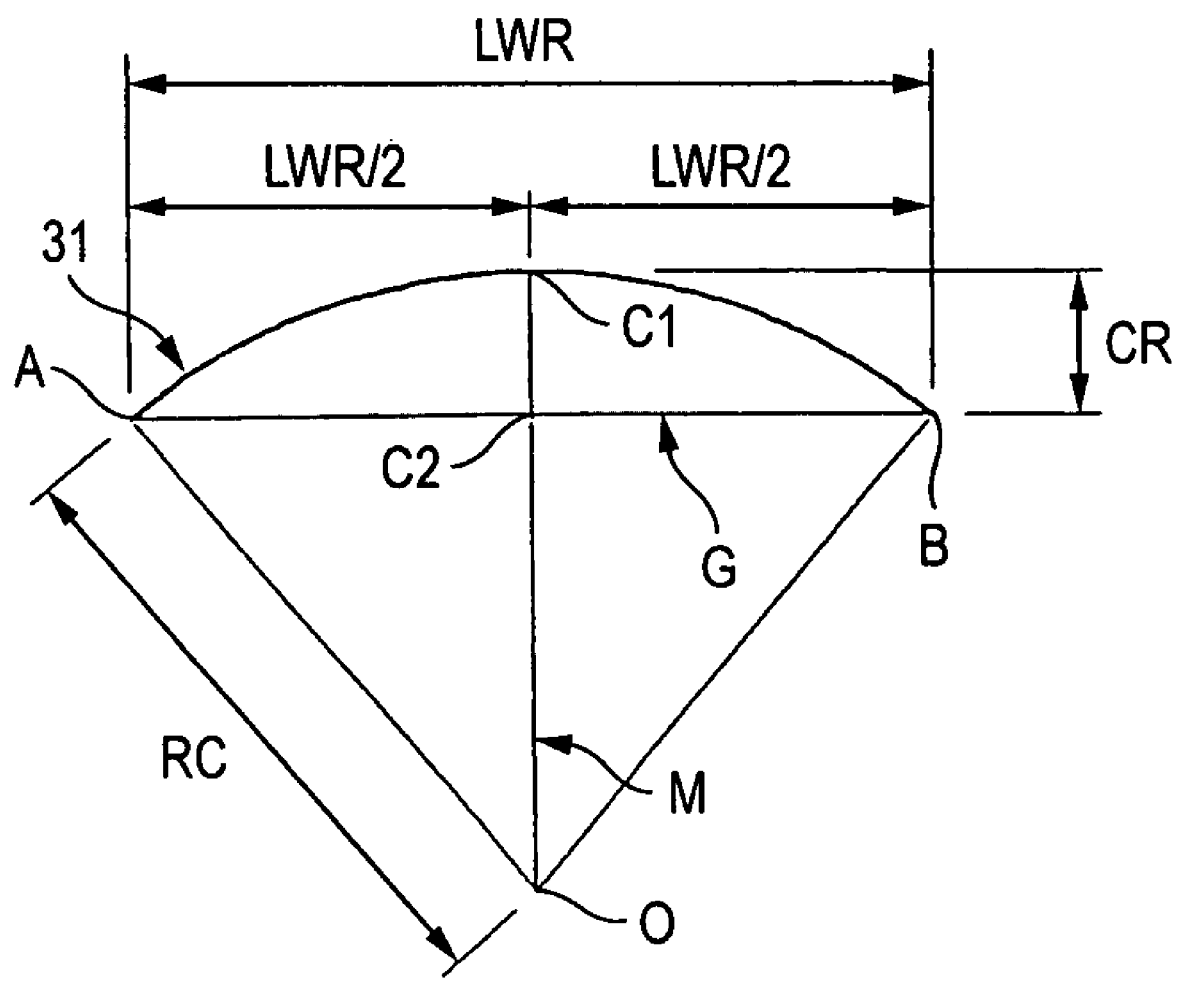
FIG. 9 is a diagram showing exemplarily the shape of the crowning applied to a rolling contact surface of the tapered roller.

FIG. 8 is a diagram which shows a contour of an upper half of an axial section of the tapered roller 30. In FIG. 8, a substantially rectilinear rolling contact surface 31 and chamfered portions 32a, 33a which are formed in such a manner as to slope downwards smoothly from axial edges of the rolling contact surface 31 are provided on an outer circumferential surface of the tapered roller 30. The chamfered portions 32a, 33a are also formed in such a manner as to smoothly continue to the small diameter side end face 32 and the large diameter side end face 33, respectively. The full crowning which slightly protrudes towards an outside diameter direction to the rolling contact surface 31 which appears rectilinear. FIG. 9 is a diagram which shows exemplarily only the shape of the crowning between an end point A and an endpoint B of an effective length LWR of the rolling contact surface 31 shown in FIG. 8.

In this specification, the crowning amount of the tapered roller 30 (hereinafter, referred to as the roller crowning amount) is regulated as a distance between an arc center point of the crowning which is determined by the roller effective length LWR of the rolling contact surface 31 and a chord thereof. A calculation method of the roller crowning amount will be described below.

In FIG. 8, when L represents a width of the rolling contact surface 31 relative to a center axis direction of the tapered roller 30, γ represents an angle (roller angle) of the rolling contact surface 31, and S1, S2 represent dimensions of illustrated curved surfaces of the chamfered portions 32a, 33a formed at both the edge portions of the rolling contact surface 31, respectively, the aforesaid roller effective length LWR is obtained by the following equation (3):

$$LWR = L/\cos(\gamma/2) - (S1 + S2) \qquad (3)$$

A constant width is determined for S1, S2 depending on the size of the bearing.

In FIG. 9, a straight line M which passes through a middle point C2 of the chord G of the crowning for the roller effective length LWR and the center O of the arc of the crowning intersects the chord G at right angles and passes through a central point C1 of the crowning for the roller effective length LWR.

In this specification, a distance between the crowning arch central point C1 and the middle point C2 is defined as a roller crowning amount CR. Namely, when RC represents a radius of the crowning arc as is shown in the figure, the roller crowning amount CR is obtained by the following equation (4):

$$CR = RC - \{RC^2 - (LWR/2)^2\}^{1/2} \qquad (4)$$

Figure 10:
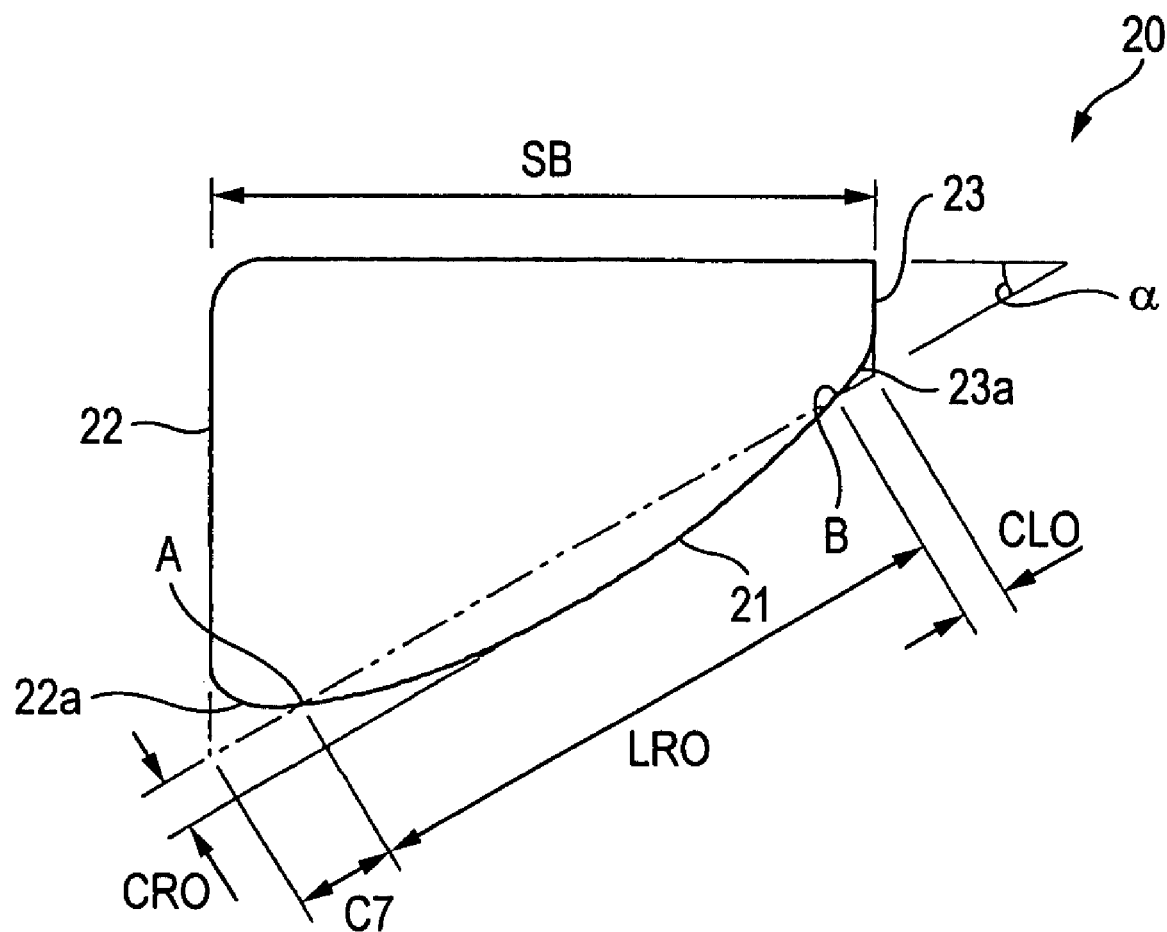
FIG. 10 is a diagram showing a contour and the shape of a crowning of an outer ring.

Next, FIG. 10 is a diagram which shows a contour of an axial section of the outer ring 20 in which a full crowning is applied to the outer ring raceway surface 21 with the crowning exaggerated. In FIG. 10, the outer ring raceway surface 21 is provided on an inner circumferential surface of the outer ring 20 in such a manner as to be brought into rolling contact with the rolling contact surfaces 31 of the tapered rollers 30. A full crowning is applied to the outer ring raceway surface 21 in such a manner as to protrude radially inwards. Chamfered portions 22a, 23a are provided in such a manner as to extend from both edge portions of the outer ring raceway surface 21 towards axial end faces of the outer ring 20, respectively. These chamfered portions 22a, 23a are formed in such a manner as to continue smoothly to a small inside diameter side end face 22 and a large inside diameter side 23 of the outer ring 20, respectively.

In this specification, the amount of crowing of the outer ring 20 (hereinafter, referred to as the outer ring crowning amount) is defined as CRO which is a distance between a central point of an arc of the crowning which is determined by a raceway length LRO of the outer ring raceway surface 21 and a chord thereof. A calculation method of the outer ring crowning amount CRO will be described below.

In FIG. 10, when SB represents a width of the outer ring raceway surface 21 relative to an axial direction of the outer ring 20, α represents an outer ring raceway angle of the outer ring raceway surface 21, and C7, CLO represent dimensions of illustrated curved surfaces of the chamfered portions 22a, 23a which are formed at both the edge portions the outer ring raceway surface 21, respectively, the aforesaid raceway length LRO is obtained by the following equation (5):

$$LRO = SB/\cos\alpha - (C7 + CLO) \qquad (5)$$

Note that in the above equation (5), a constant value is determined for C7, CLO depending on the size of the bearing.

Figure 11:
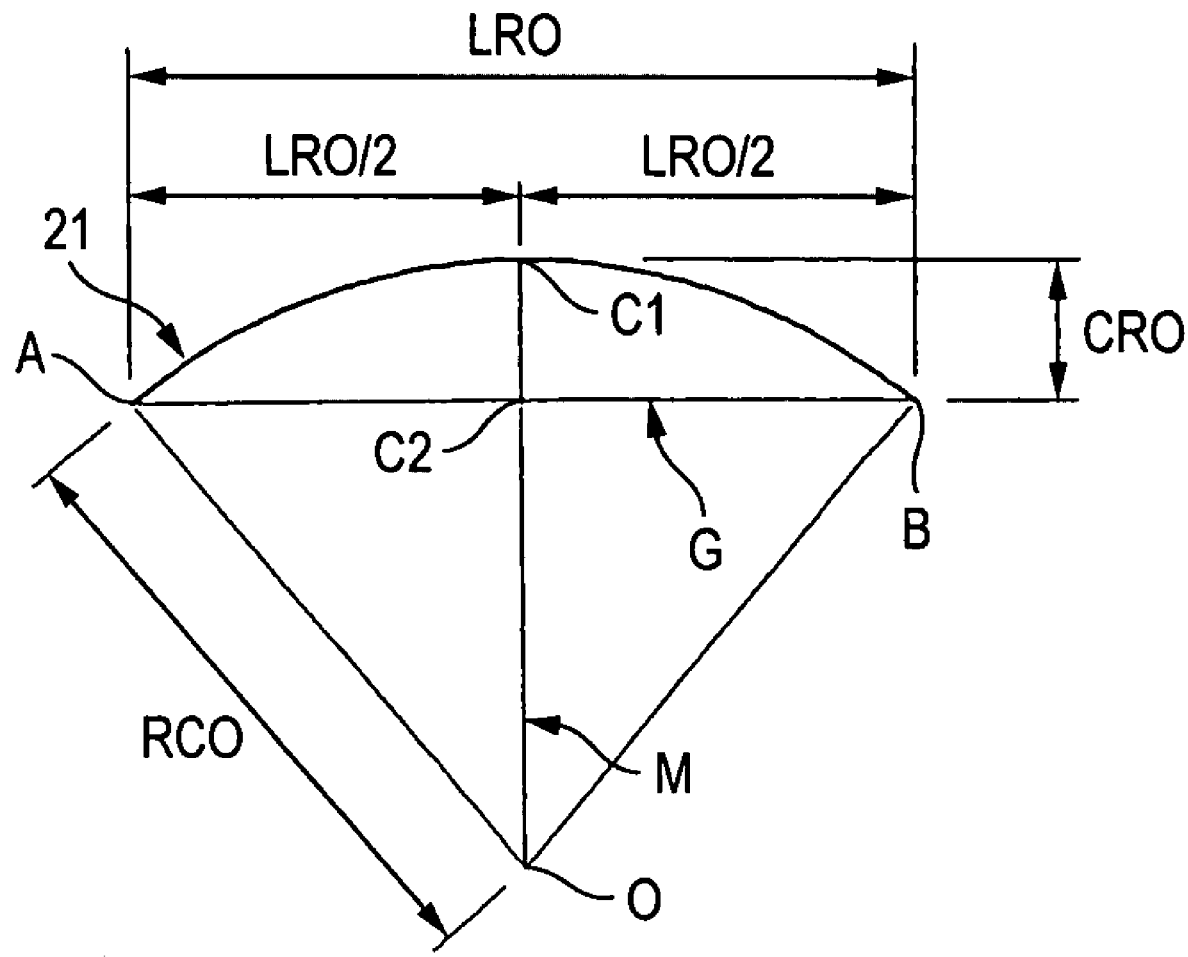
FIG. 11 is a diagram showing exemplarily the shape of the crowning applied to a raceway surface of the outer ring.

On the other hand, FIG. 11 is a diagram which shows exemplarily a sectional shape of the crowning between an end point A and an end point B of the raceway length LRO of the outer ring raceway surface 21 shown in FIG. 10. In FIG. 10, a straight line M which passes through a middle point C2 of the chord G of the crowning for the raceway length LRO and the center O of the arc of the crowning intersects the chord G at right angles and passes through a central point C1 of the crowning for the raceway length LRO.

In this specification, a distance between the crowning arch central point C1 and the middle point C2 is defined as an outer ring crowning amount CRO. Namely, when RCO represents a radius of the crowning arc as is shown in the figure, the roller crowning amount CRO is obtained by the following equation (6):

$$CRO = RCO - \{RCO^2 - (LWR/2)^2\}^{1/2} \quad (6)$$

The crowning amounts of the tapered rollers and the inner and outer rings which are fully crowned can be obtained in the manners described above.

The crowning amounts of the tapered rollers 30 and the inner and outer rings 10, 20 which are fully crowned can, of course, be calculated based on the aforesaid general idea of crownings. Namely, as in the case where the length LRI' is obtained in FIG. 4, LWR' is induced for LWR in the case of the tapered roller 30, and LRO' is induced for LRO in the case of the outer ring 20, and then crowning amounts may only have to be obtained after arc central points have been obtained. The crowning amounts obtained in this way based on the general idea of crownings substantially coincide with the values obtained based on the idea of full crownings (FIGS. 4 to 5).

Next, (RCO/LRO) is defined as an outer ring crowning parameter by the crowning radius RCO and the raceway length LRO of the outer ring 20 which were obtained as has been described above. (RCI/LRI) is defined as an inner ring crowning parameter by the crowning radius RCI and the raceway length LRI of the inner ring 10.

In this specification, a total crowning amount, an outer ring crowning rate, a roller crowning rate and an inner ring crowning rate are calculated from the roller crowning amount, the inner ring crowning amount and the outer ring crowning amount based on the following equations (7), (8), (9), and (10).

Total crowning amount=outer ring crowning amount+ inner ring crowning amount+roller crowning amount×2   (7)

Outer ring crowing rate=outer ring crowning amount/ total crowing amount   (8)

Roller crowing rate=(roller crowning amount×2)/total crowning amount   (9)

Inner ring crowning rate=inner ring crowning amount/ total crowning rate   (10)

As has been described before, in the invention, the rib angle is made to fall within the predetermined range in view of the fact that in a case where the proportion (the ratio of roller length to roller diameter=LWR/DW) of the tapered roller and the crowning amounts are controlled in order to reduce the running torque, when the LWR/DW is decreased (the roller diameter is increased), the running torque is increased in the low rotational speed range. Specifically speaking, when a represents the outer ring raceway angle, y represents the roller angle, and BK represents the rib angle, in order to cause the rib surface of the large rib portion to rise, the rib angle is set to fulfill the following condition:

$$\alpha - 0.87\gamma - 0.334 \leq BK \leq \alpha - 0.87\gamma - 0.167.$$

In FIG. 2, a solid line indicates the rib surface according to the invention, and it is seen that when compared to a rib surface indicated by a chain double-dashed line in which the ratio of roller length to roller diameter is close to the lower limit value of 1.1 in the tapered roller bearing proposed by WO2005100809, the contact position between the large diameter side end face 33 of the roller and the rib surface 12a of the large rib portion 12 is lowered (in the figure, a height from the inner ring raceway surface to the contact position is decreased from e' to e). The torque in the low rotational speed range can be decreased by lowering the contact position. The upper limit value ($\alpha - 0.87\gamma - 0.167$) of the range of the rib angle BK is a value at which a running torque is obtained which is substantially the same as the running torque of the conventional tapered roller bearings which had been marketed before the applicant for the subject patent application proposed the tapered roller bearings in PCT/JP2005/7260. In other words, the upper limit value is the value which can suppress the increase in torque in the low rotational speed range. On the other hand, while the torque reduction effect increases as the rib angle BK decreases, in the event that the rib angle BK decreases too low, the large diameter side end face 33 of the roller comes to interfere with the recess portion 50 formed in the rib surface 12a of the large rib portion 12, and the contact stress between the large diameter side end face 33 of the roller 30 and the rib surface 12a of the large rib portion 12 becomes too large, whereby the running torque is increased, on the contrary. The lower limit value ($\alpha - 0.87\gamma - 0.334$) of the rib angle BK is set to a value which prevents the large diameter side end face 33 of the roller 30 from coming to interfere with an edge 50a of the recess portion 50.

Next, the results of an investigation will be described which was carried out on a relationship between running torque, the total crowning amount and the individual crowning rates by experimentally measuring running torques of various tapered roller bearings.

Firstly, as a measuring method of running torques of tapered roller bearings, for example, a bearing testing machine was used, and after a tapered roller bearing was set on the testing machine, either of the inner and outer ring was rotated to measure a running torque that was applied to the other of the inner and outer rings. As testing conditions, the tapered roller bearing that is configured as illustrated in the aforesaid embodiment (those corresponding to JIS30306) were used, a differential gear oil was used as a lubricant, an axial load of 4 kN was applied as an artificial preload load, and the rings were rotated at two rotational speeds of 300 [r/min] and 2000 [r/min].

As lubricating conditions during the experiment, in the case of the rotational speed or 300 [r/min], only the lubricant at the normal temperature was applied in a proper amount prior to the experiment, and the experiment was carried out with no additional lubricant applied. On the other hand, in the case of the rotational speed of 2000 [r/min], the experiment was carried out while supplying the lubricant which was heated to an oil temperature of 323 K (50° C.) 0.5 liter per minute in a cyclic fashion. The reason the different supplying methods of the lubricant were used was that a running torque resulting from rolling friction could be extracted by supplying the lubricant in amounts which were necessary and minimum for the respective rotational speeds so as to eliminate as much as possible the agitation loss of the lubricant which would otherwise be generated by an excessive supply of the lubricant. The tapered roller bearings that were prepared for use for the experiment were such that their total crowning amounts and crowning rates were set differently, and running torques were measured on the tapered roller bearings so prepared, respectively, so as to grasp the relationship between the total crowing amount and the crowning rates and the running torque, whereby a range of values was specified which could reduce the running torque.

Figure 12:
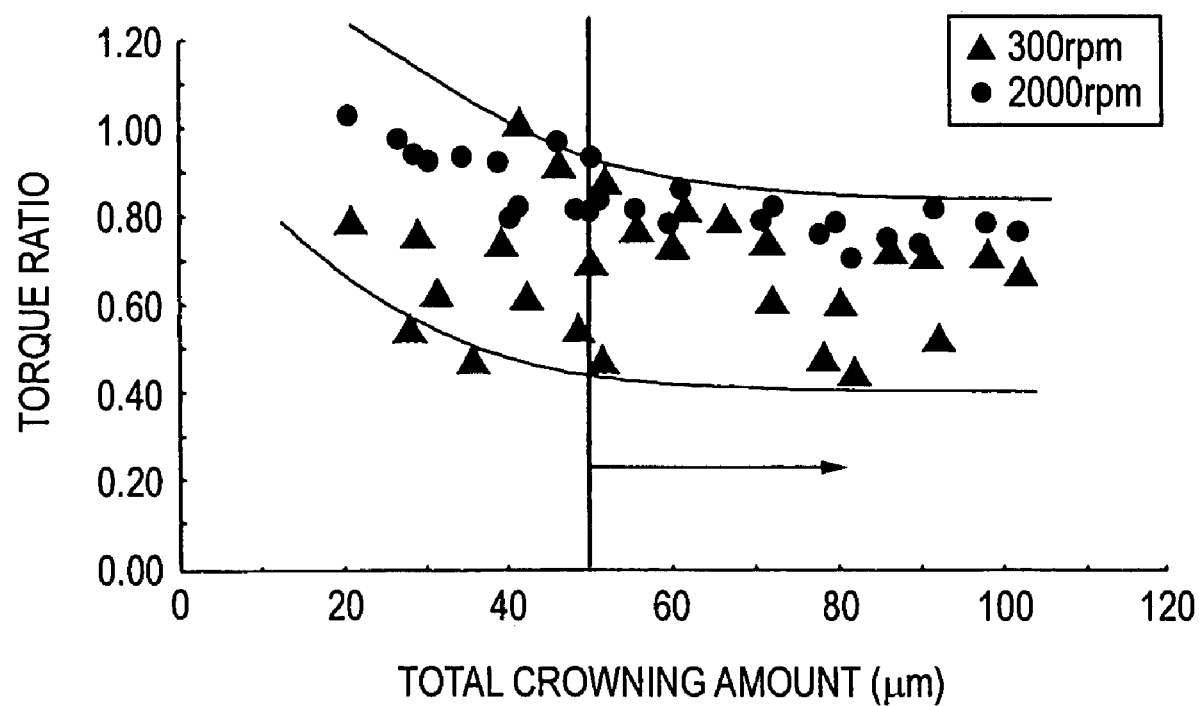
FIG. 12 is a scatter diagram showing a relationship between a total crowning amount and torque ratios of tapered roller bearings.

FIG. 12 is a scatter diagram which shows a relationship between the total crowning amount and torque ratios (running torque/predetermined value) of the measured tapered roller bearings. As is obvious from the graph, in the event that the total crowning amount is smaller than 50 μm, the torque ratios scatter in a wide width, but as the total crowning amount increases, there is indicated a tendency that a maximum value of the scattering torque ratios gradually decreases. It is seen that in the event that the total crowning amount reaches or exceeds 50 μm, compared to the case where the total crowning amount is smaller than 50 μm, the torque ratios are stably distributed within a range of smaller values. When the total crowing amount exceeds 100 μm, the behaviors of the tapered rollers became unstable, and the torque increases. Consequently, the total crowning amount is desirably 100 μm or smaller.

Figure 13:
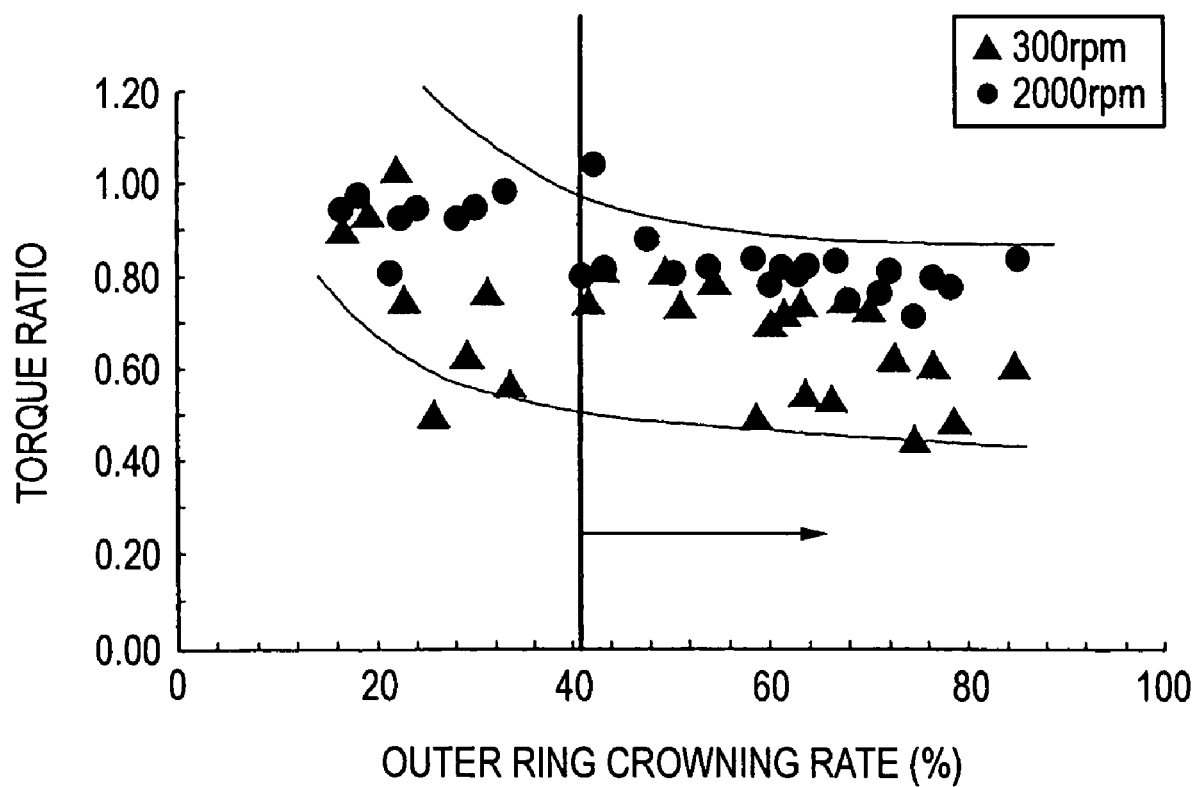
FIG. 13 is a scatter diagram showing a relationship between an outer ring crowning rate and the torque ratios of the tapered roller bearings.

Next, FIG. 13 is a scatter diagram which shows a relationship between the outer ring crowning rate and the torque ratios of the tapered roller bearings. As is obvious from the graph, in the event that the outer ring crowning rate is smaller than 40%, there is indicated a tendency that a maximum value of the torque ratios gradually decreases as the outer ring crowning rate increases. It is seen that in the event that the outer ring crowning rate is 40% or larger, compared to the case where the outer ring crowning rate is smaller than 40%, the torque ratios are stably distributed within a range of smaller values. Note that when the outer ring crowning rate exceeds 85%, in the event that an edge load is applied between the inner ring and the roller, a reduction in life is called for. Consequently, the outer ring crowning rate is desirably 85% or smaller.

Figure 14:
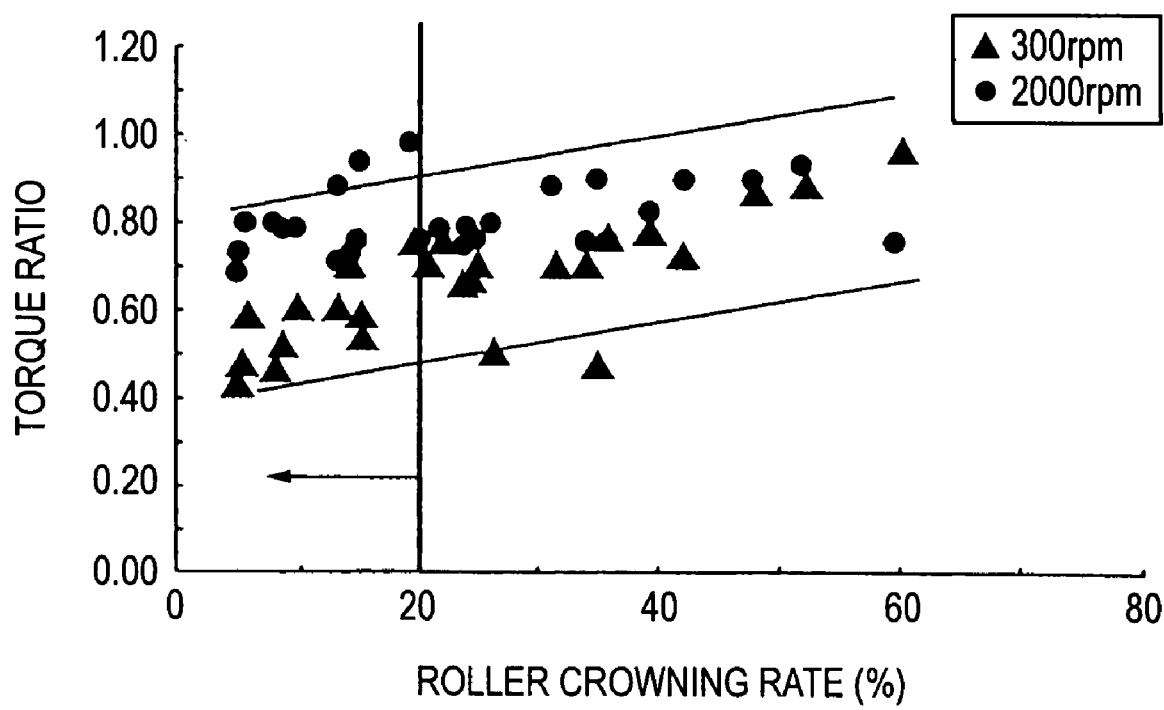
FIG. 14 is a scatter diagram showing a relationship between a roller crowning rate and the torque ratios of the tapered roller bearings.

FIG. 14 is a scatter diagram which shows a relationship between the roller crowning rate and the torque ratios of the tapered roller bearings. As is clear from the graph, in the event that the roller crowning rate is larger than 20%, there is indicated a tendency that a maximum value of roller crowning rates gradually decreases as the roller crowning rate decreases. It is seen that in the event that the roller crowning rate is 20% or smaller, torque values are stably distributed in a range of smaller values, compared to the case where the roller crowing rate is larger than 20%. When the roller crowning rate becomes smaller than 5%, a torque increase due to an increase in contact area and a decrease in life due to the occurrence of an edge load are called for. Consequently, the roller crowning rate is desirably 5% or larger.

Figure 15:
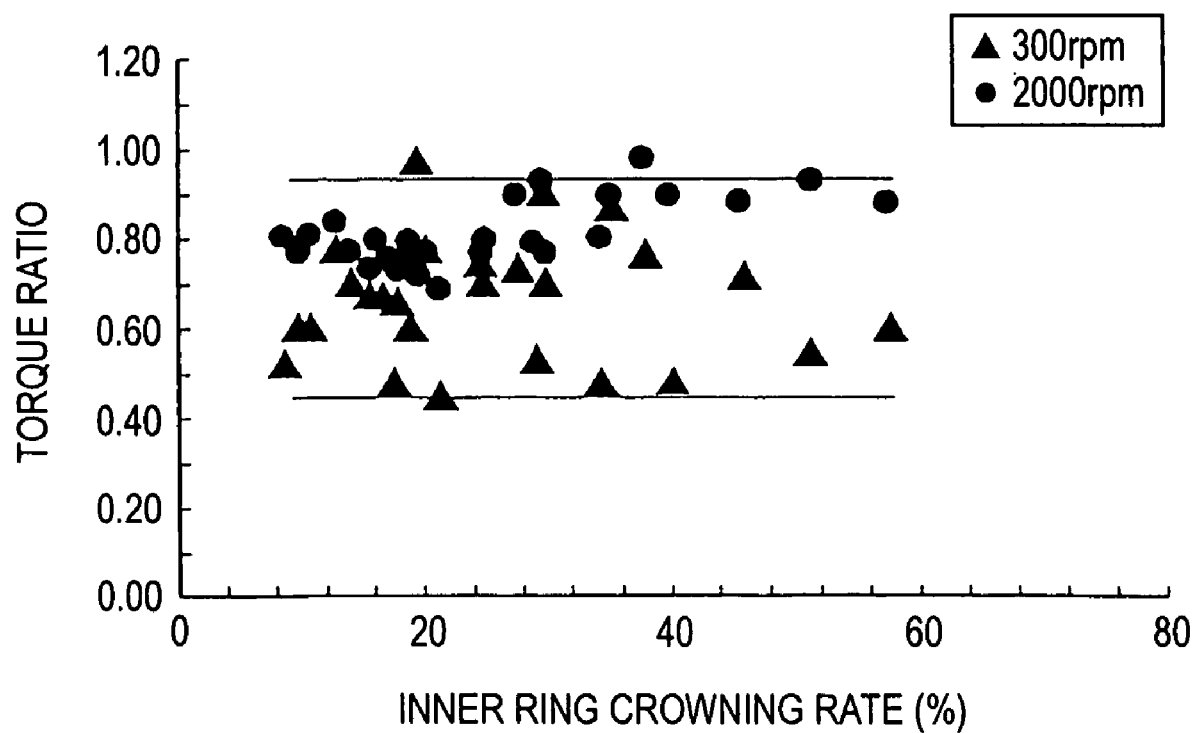
FIG. 15 is a scatter diagram showing a relationship between an inner ring crowning rate and the torque ratios of the tapered roller bearings.
Figure 16:
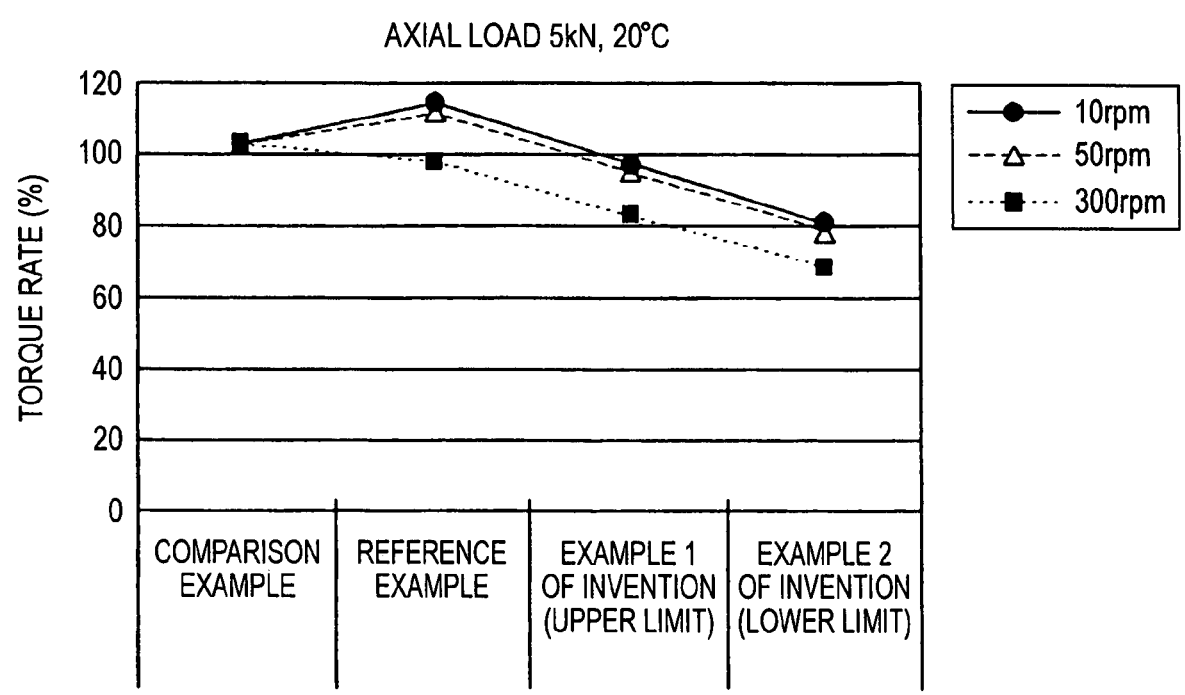
FIG. 16 is a graph showing torque rates of examples of the invention and a reference example based on a comparison example.

FIG. 15 is a scatter diagram which shows a relationship between the inner ring crowning rate and torque ratios of the tapered roller bearings. As is obvious from the graph, torque ratios are stable in a substantially constant range while the inner ring crowning rate changes. Namely, no remarkable correlation with the torque ratios of the tapered roller bearings was identified. However, by setting the inner ring crowning rate to 10% or larger, contact loads in the vicinity of both the axial edge portions of the contact surface between the inner ring raceway surface 11 and the rolling contact surfaces 31 can be decreased, whereby even in the event that an edge load is applied, the operation thereof can be decreased, thereby making it possible to prevent the reduction in life of the tapered roller bearing. When the inner ring crowning rate is made to be larger than 55%, the outer ring crowing rate is increased due to the relationship with the total crowning amount, and the torque increases. Consequently, the inner crowning rate is desirably 55% or larger.

Thus, as has been described heretofore, as a result of the investigation carried out by experimentally measuring the relationship between the torque ratios or running torques of the tapered roller bearings and the total crowning amount and the individual crowning rates, a knowledge was obtained that the running torques of the tapered roller bearings could be reduced by fulfilling the conditions that the total crowning amount was 50 μm or larger, the outer ring crowning rate was 40% or larger and the roller crowning rate was 20% or smaller.

When calculating crowning parameters in the aforesaid experiment, it was found out that the reduction in running torque could be realized by an outer ring crowning parameter (RCO/LRO) of 30 to 150 and an inner ring crowning parameter TRCI/LRI of 50 to 260.

Furthermore, it was found that the roller length/roller diameter (LWR/DW) was preferably set to 1.1 to 1.7. The reason a lower limit was set to 1.1 is that when the roller length/roller diameter (LWR/DW) decreases below this limit value, the roller diameter increases, which increases the rolling viscous resistance. The reason an upper limit was set to 1.7 is that when the roller length/roller diameter (LWR/DW) exceeds this value, the roller diameter decreases, which decreases the load capacity.

On the other hand, with respect to the roller diameter parameter (2DW/(D−d)), it was found that the parameter was preferably set to 0.44 to 0.52. The reason a lower limit was set to 0.44 is that when the roller diameter parameter (2DW/(D−d)) decreases below this value, the free space volume in the interior of the bearing decreases, and hence, the oil is made difficult to flow, whereby the reduction effect of the oil agitation loss becomes insufficient. The reason an upper limit was set to 0.52 is that when the roller diameter parameter (2DW/(D−d)) exceeds this value, the roller diameter becomes too large relative to the bearing size (inner and outer ring diameters), and the balance in the configuration of the whole bearing becomes undesirable, whereby the application thereof to general equipment becomes difficult.

It was found out that the outer ring raceway angle a worked effectively to reduce the running torque when it was in the range of 25° to 30°.

Next, an investigation experiment was carried out on tapered roller bearings which fulfill the aforesaid conditions on crowning amount and crowning parameter and have rib angles falling within the predetermined range. FIG. 12 shows torque reduction effects in the low rotational speed range of the tapered roller bearing of the invention, and in Table 1 below, a comparison example is the conventional tapered roller bearing, and a reference example is the tapered roller bearing proposed by the present applicant in WO2005100809 (PCT/JP2005/7260) in which the ratio of roller length to roller diameter expressed by LWR/DW was set to 1.42. Example 1 of the invention is the reference example in which the rib angle was set to the upper limit value (α−0.87γ−0.167) of the range of the invention and Example 2 of the invention is the reference example in which the rib angle was set to the lower limit value (α−0.87γ−0.334) of the range of the invention.

Main dimensions (bore diameter×outside diameter×assembled width) of the tapered roller bearing of the comparison example were 35×72×25 (mm), and main dimensions (bore diameter×outside diameter×assembled width) of the tapered roller bearing used as the reference example and the examples of the invention were 35×72×21 (mm).

As testing conditions, a gear oil for differentials was used as a lubricant, an axial load of 5 kN was applied as an artificial preload load, and three rotational speeds of 10 rpm, 50 rpm and 300 rpm were used. Torques of the individual examples were obtained as a ratio to the torque of the comparison example which was regarded as 100(%). The results of the experiment are shown in Table 1 below (FIG. 12 is a graphic result of Table 1).

TABLE 1

| | | Torques (Nm) | | | |
|---|---|---|---|---|---|
| | | Comparison Example | Reference Example | Example 1 (upper limit) | Example 2 (lower limit) |
| Rotational Speed | 10 rpm | 1.062 | 1.184 | 1.011 | 0.838 |
| | | 100% | 111% | 95% | 79% |
| | 50 rpm | 1.042 | 1.131 | 0.966 | 0.8 |
| | | 100% | 109% | 93% | 77% |
| | 300 rpm | 0.796 | 0.758 | 0.644 | 0.532 |
| | | 100% | 95% | 81% | 67% |

As is seen from Table 1 and FIG. 12, even in the event that the roller diameter of the tapered roller bearing is increased, the running torque in the low rotational speed can be reduced by setting the rib angle BK within the predetermined range in order to cause the rib surface of the large rib portion. In addition, within the predetermined range, the more the rib angle BK is decreased, the more the running torque can be decreased.

What is claimed is:

1. A tapered roller bearing comprising:
an outer ring;
an inner ring including a large rib portion;
a plurality of tapered rollers interposed between the outer and inner rings; and
a cage for the tapered rollers,
wherein LWR/DW is within a range of 1.1 to 1.7 where LWR represents a roller effective length of the tapered rollers and DW represents a roller mean diameter of the tapered rollers,
wherein RCO/LRO is 30 to 150, and RCI/LRI is 50 to 260 where RCO represents a crowning radius of the outer ring, LRO represents a raceway length of the outer ring, RCI represents a crowning radius of the inner ring and LRI represents a raceway length of the inner ring, and
wherein the following expressions are satisfied:

$$20° \leq \alpha \leq 30°, \text{ and}$$

$$\alpha - 0.87\gamma - 0.334 \leq BK \leq \alpha - 0.87\gamma - 0.167,$$

where $\alpha$ represents a raceway angle of the outer ring, $\gamma$ represents a roller angle of the tapered rollers, and BK represents a rib angle of the large rib portion of an inner ring.

2. The tapered roller bearing according to claim 1, wherein 2DW/(D−d) is within a range of 0.44 to 0.52 where d represents a bore diameter of the inner ring and D represents an outside diameter of the outer ring.

3. The tapered roller bearing according to claim 1, wherein the raceway angle $\alpha$ is within a range of 25° to 30°.

4. A tapered roller bearing apparatus comprising:
a tapered roller bearing according to claim 1; and
a lubricating oil inflow restricting unit that restricts inflow of an oil and is provided on an axial edge side of the tapered roller bearing between the inner and outer rings.

5. The tapered roller bearing apparatus according to claim 4, wherein
the lubricating oil inflow restricting unit includes an annular portion formed on a small diameter side edge portion of the cage so as to extend radially inwards from a position which lies close to the outer ring, and an inner circumferential edge portion of the annular portion approaches the inner ring so as to form a labyrinth seal between the inner ring and the annular portion.

6. An automotive pinion shaft supporting apparatus in which tapered roller bearings are disposed on a pinion gear side and an opposite side thereto of a pinion shaft, respectively, comprising:
the tapered roller bearing apparatus according to claim 4 including the tapered roller bearings disposed on the pinion gear side.

7. An automotive pinion shaft supporting apparatus in which tapered roller bearings are disposed on a pinion gear side and an opposite side thereto of a pinion shaft, respectively, comprising:
the tapered roller bearing apparatus according to claim 4 including the tapered roller bearings disposed on the pinion gear side.

8. The tapered roller bearing according to claim 1, wherein the inner and outer rings are fully crowned.

9. A tapered roller bearing comprising:
an outer ring;
an inner ring including a large rib portion;
a plurality of tapered rollers interposed between the outer and inner rings; and
a cage for the tapered rollers,
wherein LWR/DW is within a range of 1.1 to 1.7 where LWR represents a roller effective length of the tapered rollers and DW represents a roller mean diameter of the tapered rollers,
wherein respective raceway surfaces of the outer ring and the inner ring and rolling contact surfaces of the tapered rollers are crowned such that:
a total crowning amount, which is a sum of outer ring crowning amount, inner ring crowning amount and two times of roller crowning amount, is 50 μm or larger,
an outer ring crowning rate, which is a rate of the outer ring crowning amount on the total crowning amount, is 40% or larger, and
a roller crowning rate, which is a rate of two times of the roller crowning amount on the total crowning amount is 20% or smaller, and
wherein the following expressions are satisfied:

$$20° \leq \alpha \leq 30°, \text{ and}$$

$$\alpha - 0.87\gamma - 0.334 \leq BK \leq \alpha - 0.87\gamma - 0.167,$$

where $\alpha$ represents a raceway angle of the outer ring, $\gamma$ represents a roller angle of the tapered rollers, and BK represents a rib angle of the large rib portion.

10. The tapered roller bearing according to claim 9, wherein 2DW/(D−d) is within a range of 0.44 to 0.52 where d represents a bore diameter of the inner ring and D represents an outside diameter of the outer ring.

11. The tapered roller bearing according to claim 9, wherein the raceway angle $\alpha$ is within a range of 25° to 30°.

12. The tapered roller bearing according to claim 9, wherein an inner ring crowning rate, which is a rate of the inner ring crowning amount on the total crowning amount, is 10% or larger.

13. A tapered roller bearing apparatus comprising:
a tapered roller bearing according to claim 9; and
a lubricating oil inflow restricting unit that restricts inflow of an oil and is provided on an axial edge side of the tapered roller bearing between the inner and outer rings.

14. The tapered roller bearing apparatus according to claim 13, wherein the lubricating oil inflow restricting unit includes an annular portion formed on a small diameter side edge portion of the cage so as to extend radially inwards from a position which lies close to the outer ring, and an inner circumferential edge portion of the annular portion approaches the inner ring so as to form a labyrinth seal between the inner ring and the annular portion.

* * * * *